United States Patent
Onoda et al.

[15] 3,686,548
[45] Aug. 22, 1972

[54] MOTOR SYSTEM HAVING A THYRISTOR COMMUTATOR

[72] Inventors: Yoshimitsu Onoda; Takashi Tsuboi, both of Katsuta-shi, Japan

[73] Assignee: Hitachi, Ltd., Tokyo, Japan

[22] Filed: Sept. 30, 1969

[21] Appl. No.: 862,333

[30] Foreign Application Priority Data

Oct. 4, 1968  Japan ..................... 43/71817
June 23, 1969  Japan ..................... 44/49755

[52] U.S. Cl. .................. 318/138, 318/197, 318/227, 318/254, 318/35
[51] Int. Cl. .......................................... H02k 29/00
[58] Field of Search...... 318/197, 237, 227, 138, 254, 318/175, 187, 186

[56] References Cited

UNITED STATES PATENTS

| | | |
|---|---|---|
| 3,242,408 | 3/1966 | Hetzel ................... 318/227 X |
| 3,252,066 | 5/1966 | Charlton ................ 318/227 X |
| 3,274,471 | 9/1966 | Moczala ................ 318/254 X |
| 3,304,481 | 2/1967 | Saussele .................... 318/138 |
| 3,379,947 | 4/1968 | Lalonde .................... 318/237 |
| 3,418,550 | 12/1968 | Kolatorowicz et al.. 318/254X |
| 3,483,458 | 12/1969 | Kirk ...................... 318/254 X |
| 3,506,900 | 4/1970 | Neuffer et al............. 318/237 |

*Primary Examiner*—G. R. Simmons
*Attorney*—Craig, Antonelli, and Hill

[57] ABSTRACT

A motor system having a thyristor commutator which is so designed that poly phase windings mounted on a stator are energized by a poly phase alternating current supplied from an optional electric source and converted by switching means, such as an inverter, and poly phase windings mounted on a rotor are excited by a given frequency poly phase alternating current converted by a frequency changer, such as a cyclo-converter.

11 Claims, 8 Drawing Figures

INVENTORS
YOSHIMITSU ONODA and TAKASHI TSUBOI

BY Craig, Antonelli, Stewart & Hill
ATTORNEYS

INVENTORS
YOSHIMITSU ONODA and TAKASHI TSUBOI

BY
ATTORNEYS 3,686,548

MOTOR SYSTEM HAVING A THYRISTOR COMMUTATOR

The present invention relates to improvements in the motor system having a thyristor commutator.

As is well known, a brushless motor system is a variable speed motor (e.g. direct current motor) in which contactless switching elements, such as thyristors, are used in lieu of the commutator and the brush to eliminate the malfunctions caused by friction, and yet has the same characteristics as a variable speed motor.

The circuit arrangements of the brushless motor are classified into A.C. and D.C. input types. In the A.C. input type the thyristors perform both rectifier action and switching action, so that the input voltage of the motor can easily be controlled. Moreover, starting of the motor is easy because the commutation of the thyristors is effected by alternation of the source voltage, even in the absence of counter electromotive force of the motor. In the D.C. input type, as contrasted, the commutation of the thyristors is effectuated only by the counter electromotive force of the motor, so that starting of the motor is difficult. However, this can be improved by forcibly effectuating the commutation by a self-commutated inverter or D.C. chopper circuit.

The distributors used for distributing a firing signal to the gate of each thyristor according to the detected rotor position are classified into mechanical types comprising a brush and a slip ring, and electrical types consisting of a combination of light slit and photo-electric element or by making use of variable inductance or variable capacitance. However, all of these distributors merely detect the mechanical position (geometrical position) of the rotor. Besides the above, there has been used a distributor which is designed to detect the electrical position of the rotor by detecting the counter electromotive force of the motor.

As is well known, when an electric current is conducted through the armature windings, the electrical angle of the rotor deviates from the geometrical angle of the same due to the armature reaction. However, the ignition of each thyristor is preferably effected upon the electrical angle of the rotor, from the standpoint of the commutation of the thyristor. From this aspect, the distributor used is preferably of the type which is designed to detect the electrical position of the rotor rather than the mechanical position of the same.

However, such a type of distributor cannot be used with the conventional commutatorless motor system as described above on account of the fact that no counter electromotive force is available at the time of starting.

On the other hand, when the distributor of the type adapted to detect the mechanical position of the rotor is used, since the mechanical (geometrical) displacement of the rotor is very small at the time of starting, the distributor practically detects only a specific position of the rotor and gives a firing signal to the gate of only that one of the thyristors which corresponds to said specific position, and so a result a large starting current flows through the thyristor. Thus, all thyristors are required to have a current capacity large enough to withstand such a large starting current. Use of the thyristors having such a large current capacity, only because of the condition at the time of starting, however, is an economic disadvantage because the current flowing through each thyristor decreases as the number of revolutions per mintue of the motor increases and the counter electromotive force becomes large.

An object of the present invention is to provide a commutatorless motor system which is so designed as to facilitate the commutation of thyristors at the time of starting and to enable a distributor to be used from the time of starting which can detect the electrical position of the rotor, even when the circuit thereof is of the D.C. input type, not speaking of the A.C. input type.

Another object of the invention is to provide a motor control system which is highly effective as a driving device for running equipment, such as vehicles, by combining the above-described brushless motor system with a known linear motor.

According to one aspect of the invention, a brushless motor system comprises a rotating machine means having a stationary poly phase winding and a rotary poly phase winding, switching means for connecting the individual windings of either one of said poly phase windings to an optional electrical source one after another in a predetermined order according to the relative position of said two poly phase windings, and given frequency poly phase A.C. source means for exciting the other poly phase winding.

According to another aspect of the invention, a motor control system comprises a brushless motor system of the character described above and linear motor means connected in parallel to either one of the poly phase windings of said brushless motor system, said linear motor means consisting of a poly phase winding of the same number of phases as said one of the poly phase windings.

Other objects and features of the present invention will become apparent from the following description of embodiments of the invention taken in conjunction with the accompanying drawings, in which.

Figure 6A:
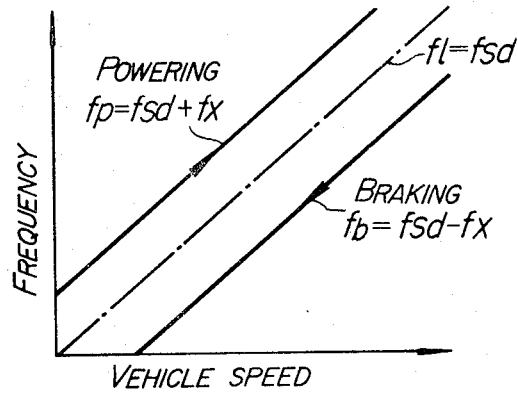
Figure 6B:
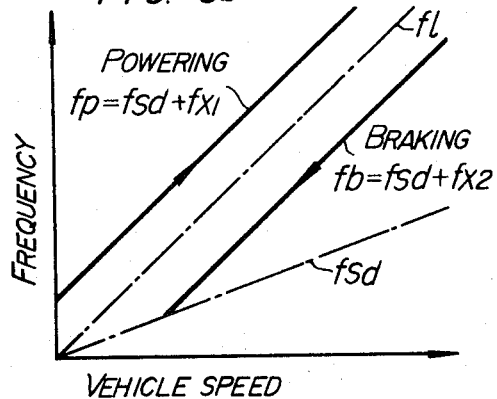
Figure 5:
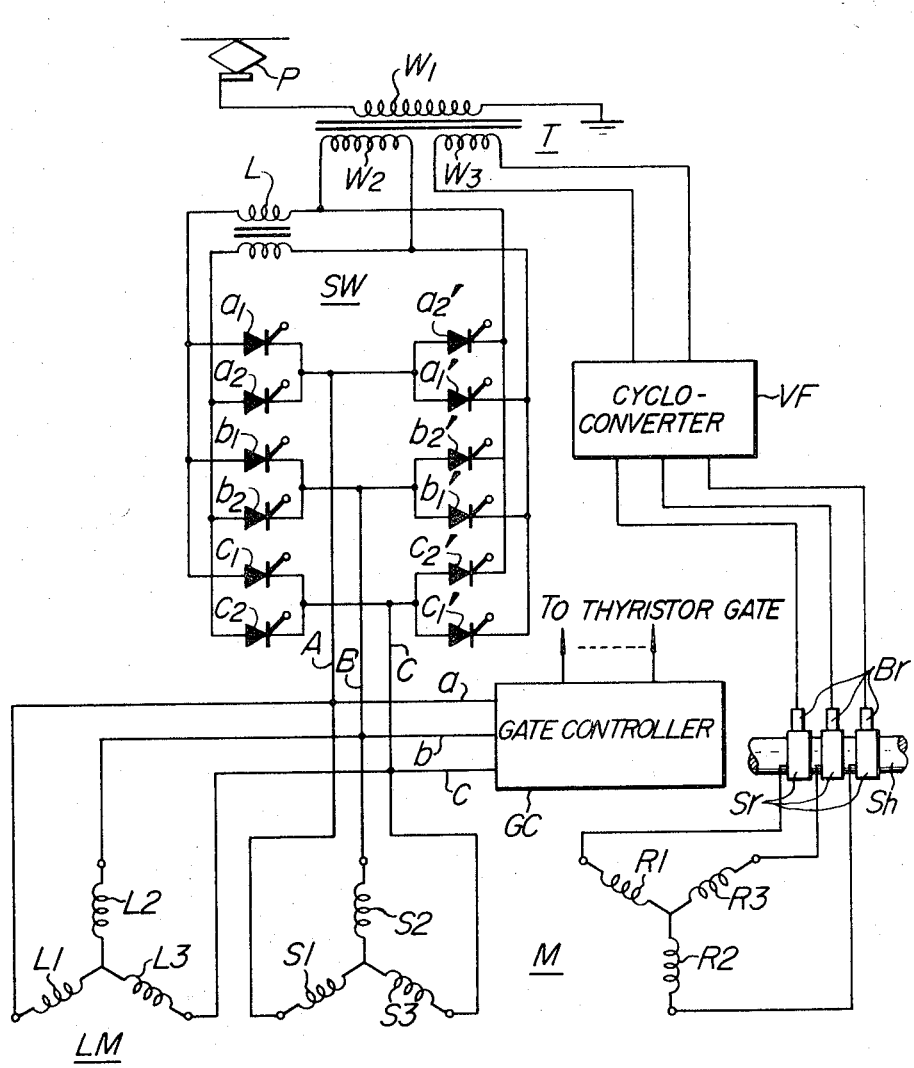

FIG. 5 is an electrical connection diagram exemplifying the driving device of an electric vehicle, which comprises in combination the commutatorless motor system according to the present invention and linear motor means; and FIGS. 6a and 6b are diagrams respectively showing the relationship between the vehicle speed and the frequency of the energize voltage of the linear motor means of the device shown in FIG. 5.

Figure 1:
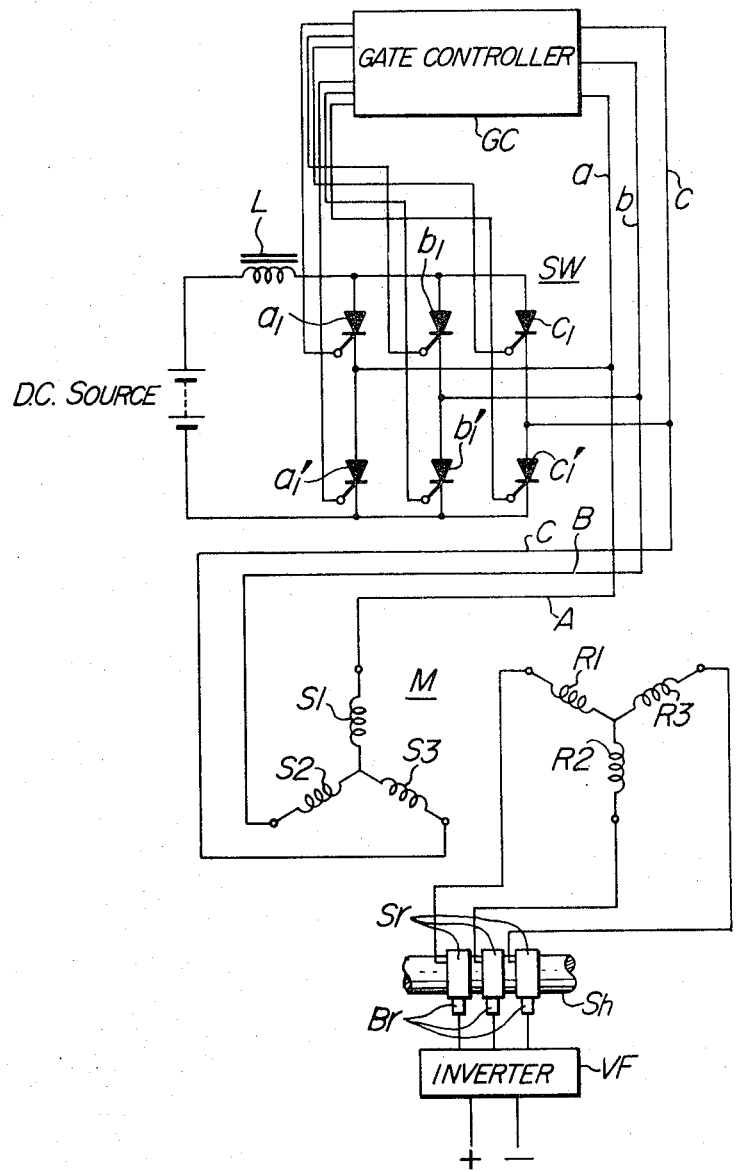
FIG. 1 is an electrical connection diagram showing the most preferred embodiment of the invention.

The most preferred embodiment of the present invention will be described with reference to FIG. 1.

A rotating machine means M used in the present invention includes stationary windings S1, S2 and S3 mounted on a stator and rotary windings R1, R2 and R3 mounted on a rotor.

One end of each of the stationary windings S1, S2 and S3 are connected together and the other ends thereof are connected to power lines A, B and C respectively, to form a poly phase winding of a star-connection. Likewise, one end of each of the rotary windings R1, R2 and R3 are connected together and the other ends thereof are connected to a slip ring Sr mounted on a rotor shaft Sh respectively, to form a poly phase winding.

The other end of the power line A is connected to the junction point between thyristors $a_1$ and $a_a'$, and the other ends of the power lines B and C are similarly connected to the junction points between thyristors $b_1$ and $b_1'$ and between thyristors $c_1$ and $c_1'$ respectively. These three series connections of the thyristors are connected in parallel to each other to constitute switching means SW. The switching means SW is connected to a D.C. source through a soothing reactor L.

The rotary windings R1, R2 and R3 are excited by a 3 phase voltage supplied thereto from an inverter VF through a brush Br and the slip ring Sr. The inverter VF is supplied with a current from a suitable D.C. source and inverts it into a 3 phase variable frequency voltage.

It is to be noted, however, that the frequency is not necessarily variable but may be any given frequency. It is also to be noted that in the present invention that neither the stationary nor rotary poly phase winding is restricted to a 3 phase winding and the number of phases can be determined to be optimum to meet the necessity and the requirement.

The thyristors of the switching means SW are selectively ignited according to the relative electrical position of the stator and rotor of the rotating machine means M. To this end, the voltages induced in the stationary windings S1, S2 and S3 are detected by detecting lines $a$, $b$ and $c$. The detected voltages are led to a gate controller GC.

Figure 2:
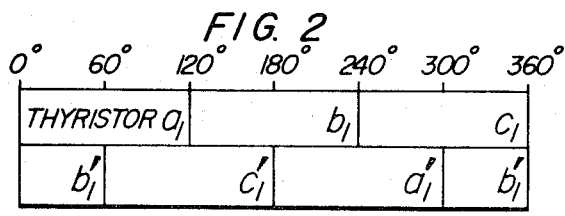
FIG. 2 is a diagram illustrating the rotor position and the ignition order of the thyristors in the system shown in FIG. 1.

The gate controller GC which may be of the type shown in FIGS. 4–23, described in Ch. 4 of "Silicon Controlled Rectifier Manual," 4th edition, 1967, published by the General Electric Company determines the thyristors to be ignited according to the detected voltage supplied thereto. An example of the thyristor ignition order is shown in FIG. 2. The operation of the system shown in FIG. 1 will be described with reference to FIG. 2 hereunder:

First of all, the inverter VF is set in motion to generate a three phase A.C. voltage. The 3 phase A.C. voltage generated is supplied to the windings R1, R2 and R3 though the brush Br and the slip ring Sr to excite the same, so that a revolving magnetic field is generated in the rotor. While the rotor is in a stationary state, transformer electromotive forces are generated in the windings S1, S2 and S3 by the action of the revolving magnetic field. The transformer electromotive forces are detected by the detecting lines $a$, $b$ and $c$ respectively and the gate controller GC determines the thyristors to be ignited based on the detected values. Now, suppose that the initial positional relation between the stationary rotor and the stator is 0°. When the ignition of the thyristors $a_1$ and $b_1'$ is determined by the gate controller GC and a firing signal is given to the gates of said respective thyristors, a circuit of L-$a_1$-A-S1-S2-B-$b_1'$ is connected to the D.C. source. Therefore, the windings S1 and S2 are energized and the rotor is set in motion. Upon rotation of the rotor through an angle of 60°, the firing signal to the gate of the thyristor $b_1'$ disappears and a firing signal to the thyristor $c_1'$ appears.

Since the thyristor $a_1$ is continuously held in the conductive state, a circuit of L-$a_1$-A-S1-S3-C-$c_1'$ is connected to the D.C. source upon ignition of the thyristor $c_1'$, and thus the windings S1 and S3 are energized. The commutation from the thyristor $b_1'$ to the thyristor $c_1'$ in the case is ensured by the aforesaid transformer electromotive force.

When the windings S1 and S3 have been energized, the rotor further rotates and reaches a position 120° from its initial position, whereupon the firing signal to the gate of the thyristor $a_1$ disappears and a firing signal to the thyristor $b_1$ appears. The current is reliably commutated from the thyristor $a_1$ to the thyristor $b_1$ by the action of a transformer electromotive force as described above and thereby a circuit of L-$b_1$-B-S2-S3-C-$c_1$ is connected to the D.C. source, energizing the winding S2 and S3.

As a result, the rotor further rotates and reaches a position 180° from the initial position, whereupon the firing signal to the gate of the thyristor $c_1'$ disappears and a firing signal to the thyristor $a_1'$ appears, and thus a circuit of L-$b_1$-B-S2-S1-A-$a_1'$ is connected to the D.C. source to further rotates the rotor. As the rotor is rotated in the manner described, the thyristors are ignited one after another and a revolving electromotive force is generated in the stationary windings S1, S2 and S3.

The rotary windings R1, R2 and R3 are excited by the 3 phase A.C. voltage, so that a counter electromotive force, well known in the art, is induced in each of the stationary windings S1, S2 and S3. The magnitude and frequency of the voltage induced is proportional to the number of revolutions per minute of the rotor when the exciting current for the rotary windings R1, R2 and R3 is constant. Therefore, while the number of revolutions per minute of the rotor is low as at the time of starting, the counter electromotive force is also small, so that commutation of the thyristors cannot be effected by said counter electromotive force alone. In this period, the counter electromotive force is supplemented by the aforesaid transformer electromotive force. The commutation of the thyristors is effected only by the counter electromotive force when the number of revolutions of the rotor has increased and said counter electromotive force has become sufficiently large.

Figure 4:
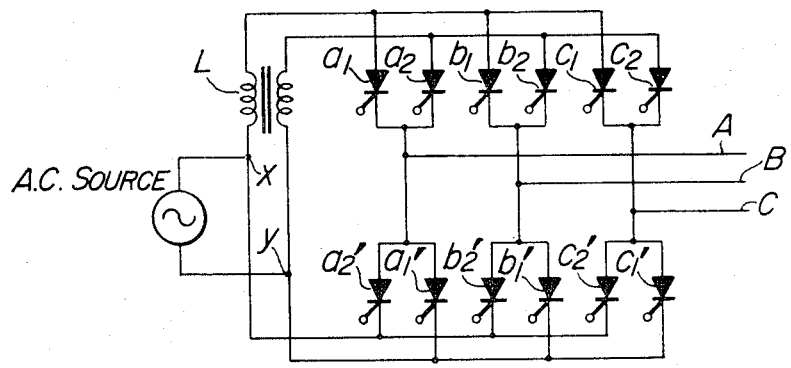
FIG. 4 is a diagram of the switching means of an A.C. input type of brushless motor.

The construction of switching means to be used in an A.C. input type circuit is exemplified in FIG. 4. In FIG. 4, the thyristors $a_1$, $b_1$ and $c_1$ and thyristors $a_1'$, $b_1'$ and $c_1'$ are selectively ignited according to the relative electrical position of the stator and the rotor when a point $x$ in an A.C. source is positive, and thyristors $a_2$, $b_2$ and $c_2$ and thyristors $a_2'$, $b_2'$ and $c_2'$ when a point $y$ is positive, and operate in exactly the same manner as described above.

Further, in the switching means use is made of a coupled type of smoothing reactor L for the purpose of avoiding an impedance voltage drop which is one of the drawbacks of the A.C. input type circuit. Therefore, no substantial effect is imposed on the switching action of the thyristors.

Next, the voltage induced in the stationary windings S1, S2 and S3 or the frequency of the line voltage in the power lines A, B and C will be discussed hereunder:

The frequency fs mentioned above is determined by the following equation:

$$fs = fr \pm Pn/120 = fr \pm fc \qquad (1)$$

wherein $fr$ represents the frequency of the exciting voltage for the rotary windings R1, R2 and R3. Therefore, the frequency of the voltage induced in the stationary windings S1, S2 and S3 by the transformer electromotive force is equal to $fr$. The symbol $fc$ in the above equation represents the frequency of the counter electromotive force, which, as is obvious from the equation, is determined by the number of pole pairs $p$ and the number of revolutions $n$ of the rotating machine means. Further, signs (±) are selected by the relationship between the rotating direction of the rotor and the rotating direction of the revolving magnetic field generated by the stationary windings S1, S2 and S3. Namely, sign (+) is the case when both of the aforesaid rotating directions are the same and sign (−) is the case when they are mutually opposite.

Figure 3A:
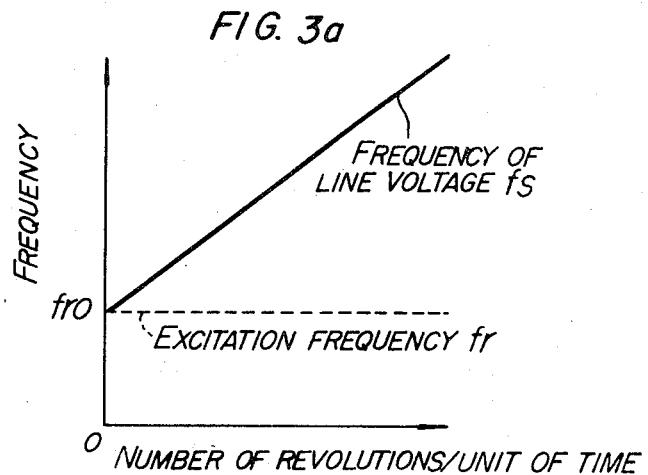
FIGS. 3a and 3b are diagrams respectively showing the relationship between the number of revolutions per minute of the rotor and the frequency of the line voltage of the system.
Figure 3B:
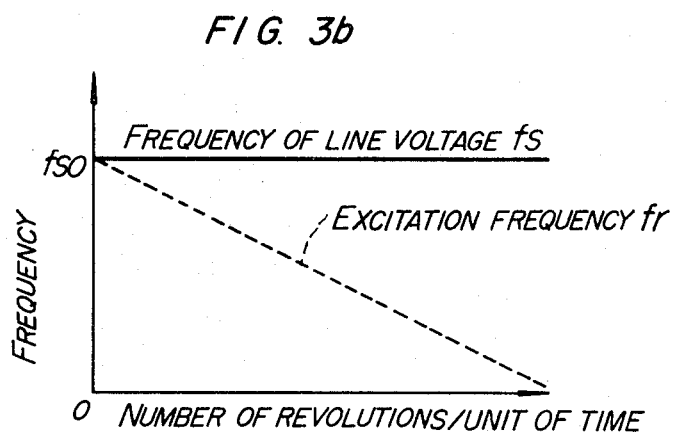

Examples of the frequency fs of the line voltage of the controlled power lines A, B ad C are shown in FIGS. 3a and 3b.

FIG. 3a shows the relationship between the number of revolutions per minute of the rotor and the frequency $fs$ when the frequency $fr$ of the excitation voltage for the rotary windings R1, R2 and R3 is maintained at a fixed value $fr0$. In this case, the value of $fs$ increases with the number of revolutions per minute.

FIG. 3b shows the case when the excitation voltage $fr$ is progressively decreased from $fs0$ in such a manner that the frequency $fs$ of line voltage will take a fixed value $fs0$ irrespective of the increasing number of revolutions per minute of the rotor.

As described above, the present invention is advantageous not only in that a distributor which detects the electrical position of the rotor by transformer electromotive force from the time of starting can be used and the commutation of thyristors is facilitated, but also in that the frequency $fs$ of the line voltage can optionally be controlled by controlling the excitation frequency $fr$. Another advantage of the invention is that the system of the invention can be applied to such a motor control system as will be described hereunder:

FIG. 5 exemplifies the application of the present invention to a motor control system. In FIG. 5 there is shown a main circuit of an electric vehicle. This electric vehicle is accelerated or decelerated by two efforts, i.e. the adhesive tractive (or braking) effort by the driving wheels and the non-adhesive tractive (or braking) effort by a known linear motor.

The tractive (or braking) effort developed by the driving wheels utilizes the coefficient of adhesion between the wheel and a rail, and hence cannot exceed the limit of adhesion which is determined by the axle weight of the wheel and aforesaid coefficient of adhesion. If the effort exceeds this limit, slipping or skidding of the wheel will result. It is in this sense that the effort which is obtained by making use of the coefficient of adhesion upon driving or braking the wheels by the rotating machine means is called adhesive tractive or braking effort as mentioned above.

In the same sense, the tractive (or braking) effort which is obtained by an action and reaction independent of coefficient of adhesion, such as that of linear motor means, is called non-adhesive tractive (or braking) effort as mentioned above.

By the construction as described above, it is possible to supplement the adhesive tractive effort with the non-adhesive tractive effort by the linear motor means in a high speed operation of the vehicle when the coefficient of adhesion is very small, and thereby to make the high speed operation of the vehicle possible. Further, by letting the tractive effort depend mainly on the rotating machine means during a low speed operation, it is possible to reduce the capacity of the linear motor means, because the linear motor means shows a very low efficiency during the low speed operation.

Referring to FIG. 5, character P designates a current collector through which electric power is fed to the vehicle from a contact wire and T designates a power transformer having a primary winding W1 thereof connected between the current collector and the earth. Of two secondary windings, a winding W2 gives electric power to an A.C. input type switch-ing means SW, while a winding W3 gives electric power to a cycloconverter VF which is used as a given frequency poly phase A.C. source means.

The output of the switching means SW energizes the stationary windings S1, S2 and S3 of the rotating machine means M and also energizes windings L1, L2 and L3 of the linear motor means LM, which are connected in parallel to said stationary windings S1, S2 and S3 respectively.

The other constructional elements are the same as those described with reference to FIGS. 1 and 4 and descriptions thereof will be omitted. A shaft Sh has the driving wheels mounted thereon through a suitable reduction gear. The linear motor means LM is represented by its winding only and the secondary side (reaction rail) thereof is not shown.

The operation of the motor control system shown in FIG. 5 will be explained hereunder with reference to FIGS. 6a and 6b.

The synchronous frequency $fl$ of linear motor means is generally represented by the following equation:

$$fl = V/l \text{(hertz)} \qquad (2)$$

wherein $V$ (m/sec) means the relative speed between the primary and secondary sides of the linear motor means (namely, the vehicle speed) and $l$ (m) means the pole pitch of the linear motor means.

Therefore, the linear motor means LM develops a tractive effort, as does an induction motor, when energized at a frequency not lower than $fl$, and developes a regenerative braking effort, while serving as an induction generator, when energized at a frequency not higher than $fl$.

Firstly, explanation will be given on the case when the value of $fr$ in equation (1) is zero or when the frequency fsd of the line voltage upon exiting the rotary windings R1, R2 and R3 by the D.C. source is equal to the synchronous frequency $fl$, in equation (2), of the linear motor means as shown in FIG. 6a. Such case can be realized by suitably selecting the number of pole pairs $P$ of the rotating machine means M and the pole pitch $l$ of the linear motor means LM.

In this case, the phase rotation of the three phase A.C. voltage to excite the rotary windings R1, R2 and R3 is made to coincide with the rotating direction of the rotor at the time of powering. Therefore, the frequency $fp$ of the voltage induced in the stationary windings S1, S2 and S3 is:

$$fsd + fx \ (>fl)$$

wherein $fx$ means the excitation frequency of the rotary windings R1, R2 and R3. Namely, the linear motor means LM develops a non-adhesive tractive effort.

At the time of braking, on the other hand, the rotating machine means M acts as a generator, whose induced power is taken back to a power source through the switching means SW and power transformer T, to effect the regenerative breaking effort to the vehicle. Furthermore, the phase rotation of the three phase A.C. voltage is made opposite to the rotating direction of the rotor, whereby the frequency $fb$ of the voltage induced in the stationary windings S1, S2 and S3 is:

$$fsd - fx \ (<fl)$$

and thus the linear motor means LM develops a non-adhesive braking effort.

Although in the controlling operation described above the system was set so that $fl$ becomes exactly the same as $fsd$, it is to be understood that these frequencies may not necessarily be exactly the same but one may be slightly higher than another. All that is necessary is that the values of $fp$ and $fb$ satisfy the relations $fp > fl$ and $fb < fl$.

In a system, such as the conventional brushless motor system, wherein the rotary windings R1, R2 and R3 are excited by a D.C. source, the frequency $fs$ of the voltage induced in the stationary windings S1, S2 and S3 is determined solely by the number of revolutions per minute (vehicle speed) of the rotor. Therefore, the system is only capable of either powering or braking, depending upon whether it is designed to allow the thus determined frequency to exceed or not to exceed the synchronous frequency $fl$ of the linear motor means LM.

However, with the brushless motor system of this invention, either of powering and braking actions can be obtained merely by switching the phase rotation, and furthermore such switching of phase rotation is not even necessary when the system is set in the way shown in FIG. 6b.

Namely, in this way of controlling operation the relationship between $fsd$ and $fl$ is set so as to be $fsd < fl$ and the frequencies $fx1$ and $fx2$ of the three phase A.C. voltage are selected so that $$fsd + fxl > fl$$

at the time of powering and $$fsd + fx2 < fl$$

at the time of braking. The directions of phase rotation are the same in both cases. By the arrangement as described above, the linear motor means LM brings about a non-adhesive tractive effort at the time of powering because it is energized by a voltage whose the frequency is not lower than the synchronous frequency $fl$, and a non-adhesive regenerative braking effort at the time of braking because it is energized by a voltage whose frequency is not higher than said synchronous frequency $fl$.

According to controlling operation, therefore, it is not necessary to switch the phase rotation but it is only necessary to change the frequency of the voltage between the time of powering and the time of braking, which voltage excites the rotary windings R1, R2 and R3. The spirit of such controlling operation is not restricted only to the setting of the frequencies in the relation $fsd < fl$, but can sufficiently be demonstrated when the frequencies are set to be $fsd > fl$. Namely, in this case the frequencies $f'x1$ and $f'x2$ have only to be selected so as to satisfy the relation:

$$fsd - f'x1 > fl$$

at the time of powering and the relation:

$$fsd - f'x2 < fl$$

at the time braking.

As may be apparent in FIG. 6b, in either controlling operation the braking effort is subjected to a limitation when $fsd < fl$ and the tractive effort at the time of powering is subjected to a limitation when $fsd > fl$, during low speed operation of the vehicle. However, this is not detrimental to the vehicle operation because the requirement for the non-adhesive effort of the linear motor means LM is not so strong during the low speed operation of the vehicle.

From the foregoing description, it will be understood that the present invention fully attains the intended objects. In addition, by the combined use of the brushless motor system according to the present invention with linear motor means, it is possible to obtain a motor control system which can be used as a driving device for running equipments designed to be operated at high speeds, such as high speed vehicles.

Although the present invention has been described herein with reference to the most preferred embodiments thereof, it should be understood that the invention is not restricted only to the embodiments but many changes and modifications are possible without deviating from the spirit of the invention as set forth in the appended claims.

What is claimed is:

1. A motor system comprising:
   rotating machine means having a stationary poly phase winding and a rotary poly phase winding and a first power source therefor;
   switching means successively connecting the individual windings of one of said poly phase windings to a second electrical power source in a predetermined order in accordance with the relative electrical positions between said poly phase windings;
   said first power source comprising poly phase alternating current source means of a given frequency for exciting the other of said poly phase windings; and
   distributor means, responsive to the relative electrical positions between the winding voltages induced in the individual windings of said one of said poly phase windings, representative of the relative electrical positions between said stationary and rotary poly phase windings, for controlling the connecting operation of said switching means.

2. A motor system according to claim 1, wherein said switching means comprises:
   a plurality of thyristors, pairs of which are connected in series across said second electrical power source, the number of pairs of said thyristors being equal to the number of the poly phase windings, and wherein the control electrodes of said thyristors are connected to the output of said distributor means, the common connection of each respective series pair of thyristors being connected to a separate one of said individual windings of said one of said poly phase windings.

3. In a motor control system having rotating machine means having a stationary poly phase winding and a rotary poly phase winding; switching means for successively connecting the individual windings of one of said poly phase windings to an electrical power source in a predetermined order in accordance with the relative electrical positions between said poly phase windings;
poly phase alternating current source means of a given frequency for exciting the other of said poly phase windings; and
distributor means, responsive to the relative electrical positions between the winding voltages induced in the individual windings in said one of said poly phase windings, representative of the relative electrical positions between said stationary and rotary poly phase windings, for controlling the connecting operation of said switching means;
the method of controlling the frequency of the line voltage provided at the winding terminals of said stationary poly phase winding, comprising the steps of:
maintaining the frequency of said poly phase alternating current source means constant; and
controlling the rotational speed of said rotary poly phase windings, whereby the frequency of said line voltage will be proportional to the rotational speed of said rotary poly phase windings.

4. In a motor system having a stationary poly phase winding and a rotary poly phase winding;
switching means for successively connecting the individual windings of one of said poly phase windings to an electrical power source in a predetermined order in accordance with the relative electrical positions between said poly phase windings;
poly phase alternating current source means of a given frequency for exciting the other of said poly phase windings; and
distributor means, responsive to the relative electrical positions between the winding voltages induced in the individual windings in said one of said poly phase windings, representative of the relative electrical positions between said stationary and rotary poly phase windings, for controlling the connecting operation of said switching means;
the method of controlling the frequency of the winding voltage provided at the winding terminals of said stationary poly phase winding, comprising the steps of:
progressively varying the excitation frequency of said poly phase alternating current source means while varying the rotational speed of said rotary poly phase winding, whereby the frequency of the voltage induced in said one of said poly phase windings may be maintained constant.

5. A method in accordance with claim 4, wherein said step of progressively varying the excitation frequency of said poly phase alternating current source means includes the step of progressively increasing the excitation frequency of said poly phase alternating current source means, and wherein the step of varying the rotational speed of said rotary poly phase winding comprises the step of decreasing the rotational speed of said rotary poly phase winding.

6. A method in accordance with claim 4, wherein the step of progressively varying the excitation frequency of said poly phase alternating current source means includes the step of progressively decreasing the excitation frequency of said poly phase alternating current source means, and wherein the step of varying the rotational speed of said rotary poly phase winding comprises the step of increasing the rotational speed of said rotary poly phase winding.

7. A motor control system comprising:
rotating machine means having a stationary poly phase winding and a rotary poly phase winding and a first power source therefor;
switching means for successively connecting the individual windings of one of said poly phase windings to a second electrical power source in a predetermined order in accordance with the relative electrical positions between said poly phase windings;
said first power source comprising poly phase alternating current source means of a given frequency for exciting the other of said polyphase windings;
linear motor means having a plurality of primary magnetic poles, responsive to the magnetic fields generated by the flow of current through one of said polyphase windings successively connected to said electrical power source by said switching means, being connected in parallel with said one of said polyphase windings and having secondary conductors provided in opposed relationship with said primary magnetic poles; and
distributor means, responsive to the relative electrical positions between winding voltages induced in the individual windings of said one of the polyphase windings, representative of the relative electrical positions between said stationary and rotary polyphase windings, for controlling the operation of said switching means.

8. A motor control system as defined in claim 7, wherein the rotating direction of the phase rotation of said poly phase alternating current source is changeable the frequency of the voltage to energize the windings of said linear motor means being higher than the frequency to bring said linear motor means into a synchronous state at the time of powering and the frequency of the voltage to energize the windings of said linear motor means being lower than the frequency to bring said linear motor means into a synchronous state at the time of braking.

9. A motor control system as defined in claim 7, wherein said poly phase alternating current source means has phase rotations in the same direction and is capable of supplying voltages of mutually different frequencies, the frequency of the voltage for energizing the windings of said linear motor means being higher than the frequency to bring said linear motor means into a synchronous state at the time of powering and the frequency of the voltage for energizing the windings of said linear motor being lower than the frequency for bringing the linear motor means into a synchronous state at the time of braking.

10. In a motor control system having
rotating machine means having a stationary poly phase winding and a rotary poly phase winding and a first power source therefor;
switching means for successively connecting the individual windings of one of said poly phase windings to a second electrical power source in a predetermined order in accordance with the relative electrical positions between said poly phase windings;
said first power source comprising poly phase alternating current source means of a given frequency for exciting the other of said poly phase windings;
linear motor means having a plurality of primary magnetic poles, responsive to the magnetic fields generated by the flow of current through one of said poly phase windings, successively connected to said electrical power source by said switching means, being connected in parallel with said one of said poly phase windings and having secondary conductors provided in opposed relationship with said primary magnetic poles; and
distributor means, responsive to the relative electrical positions between winding voltages induced in the individual windings of said one of the poly phase windings, representative of the relative electrical positions between said stationary and rotary poly phase windings, for controlling the operation of said switching means,
the method of controlling the operation of said motor, comprising the steps of:
changing the rotating direction of the phase rotation of said poly phase alternating current source and adjusting the frequency of the voltage for energizing the windings of said linear motor means and the frequency for bringing the linear motor means into a synchronous state,
whereby the frequency of the voltage for energizing the windings of said linear motor will become higher than the frequency for bringing the linear motor means into a synchronous state at the time of powering and the frequency of the voltage for energizing the windings of said linear motor will become lower than the frequency for bringing the linear motor means into a synchronous state at the time of braking.

11. In a motor control system having
rotating machine means having a stationary poly phase winding and a rotary poly phase winding and a first power source therefor;
switching means for successively connecting the individual windings of one of said poly phase windings to a second electrical power source in a predetermined order in accordance with the relative electrical positions between said poly phase windings;
said first power source comprising poly phase alternating current source means of a given frequency for exciting the other of said poly phase windings;
linear motor means having a plurality of primary magnetic poles, responsive to the magnetic fields generated by the flow of current through one of said poly phase windings successively connected to said electrical power source by said switching means, being connected in parallel with said one of said poly phase windings and having secondary conductors provided in opposed relationship with said primary magnetic poles; and
distributor means, responsive to the relative electrical positions between winding voltages induced in the individual windings of said one of the poly phase windings, representative of the relative electrical positions between said stationary and rotary poly phase windings, for controlling the operation of said switching means,
the method of controlling the operation of said motor, comprising the steps of:
maintaining the direction of phase rotation of said poly phase alternating current source in the same direction; and
supplying, from said alternating current source, voltages at mutually different frequencies;
whereby the frequency of the voltage for energizing the windings of said linear motor will become higher than the frequency for bringing on the linear motor means into a synchronous state at the time of powering and the frequency of the voltage for energizing the windings of the linear motor will become lower than the frequency for bringing the linear motor means into a synchronous state at the time of braking.

* * * * *